United States Patent
Chan et al.

(10) Patent No.: US 10,486,708 B1
(45) Date of Patent: Nov. 26, 2019

(54) SYSTEM FOR ADJUSTING AUTONOMOUS VEHICLE DRIVING BEHAVIOR TO MIMIC THAT OF NEIGHBORING/SURROUNDING VEHICLES

(71) Applicant: STATE FARM MUTUAL AUTOMOBILE INSURANCE COMPANY, Bloomington, IL (US)

(72) Inventors: Leo Nelson Chan, Normal, IL (US); Kristopher Keith Gaudin, Bloomington, IL (US); Roxane Lyons, Chenoa, IL (US); William J. Leise, Normal, IL (US); John A. Nepomuceno, Bloomington, IL (US); Rajiv C. Shah, Bloomington, IL (US); Edward P. Matesevac, III, Normal, IL (US); Jennifer Criswell Kellett, Lincoln, IL (US); Steven Cielocha, Bloomington, IL (US); Jeremy Myers, Normal, IL (US); Matthew S. Megyese, Bloomington, IL (US); Jennifer L. Crawford, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 15/482,473

(22) Filed: Apr. 7, 2017

Related U.S. Application Data

(60) Provisional application No. 62/401,116, filed on Sep. 28, 2016, provisional application No. 62/340,302,
(Continued)

(51) Int. Cl.
*B60W 40/09* (2012.01)
*G08G 1/0967* (2006.01)
(Continued)

(52) U.S. Cl.
CPC ......... *B60W 40/09* (2013.01); *G06K 9/00825* (2013.01); *G06Q 40/08* (2013.01);
(Continued)

(58) Field of Classification Search
CPC .............. B60W 40/09; B60W 2540/30; G08G 1/096791; G08G 1/0112; G09B 19/167;
(Continued)

(56) References Cited

U.S. PATENT DOCUMENTS

| 4,864,298 A | 9/1989 | Dombrowski |
| 5,828,299 A | 10/1998 | Chen |

(Continued)

OTHER PUBLICATIONS

Fingas, Waze warns you about dangerous intersections in big US cities, downloaded from the Internet at: <https://www.engadget.com/2016/03/23/waze-warns-about-dangerous-intersections/> (Mar. 23, 2016).

(Continued)

*Primary Examiner* — Hussein Elchanti
(74) *Attorney, Agent, or Firm* — Marshall, Gerstein & Borun LLP; Randall G. Rueth

(57) ABSTRACT

Systems and methods are disclosed for adjusting autonomous vehicle driving behavior. A controller of the autonomous vehicle may utilize an aggression factor to adjust control of the autonomous vehicle. The autonomous vehicle may detect one or more characteristics of proximate vehicles, analyze the one or more characteristics to estimate an aggression level of the proximate vehicles, and adjust the aggression factor based on the estimated aggression level.

16 Claims, 8 Drawing Sheets

Related U.S. Application Data filed on May 23, 2016, provisional application No. 62/321,005, filed on Apr. 11, 2016, provisional application No. 62/321,010, filed on Apr. 11, 2016.

(51) Int. Cl.
  *G09B 19/16* (2006.01)
  *G06K 9/00* (2006.01)
  *G08G 1/01* (2006.01)
  *G06Q 40/08* (2012.01)
  *F16H 59/00* (2006.01)

(52) U.S. Cl.
  CPC ..... *G08G 1/0112* (2013.01); *G08G 1/096791* (2013.01); *G09B 19/167* (2013.01); *B60T 2220/02* (2013.01); *B60W 2540/30* (2013.01); *F16H 2059/003* (2013.01)

(58) Field of Classification Search
  CPC ............... G06K 9/00825; G06Q 40/08; B60T 2220/02; F16H 2059/003
  See application file for complete search history.

(56) References Cited

U.S. PATENT DOCUMENTS

| | | | |
|---|---|---|---|
| 6,161,641 A | 12/2000 | Fukumura et al. | |
| 6,632,138 B1 | 10/2003 | Serizawa et al. | |
| 6,744,349 B1 | 6/2004 | Asakura et al. | |
| 6,922,624 B2 | 7/2005 | Isaji et al. | |
| 8,805,707 B2 | 8/2014 | Schumann, Jr. et al. | |
| 8,938,337 B2 | 1/2015 | Nakakura et al. | |
| 8,954,340 B2 | 2/2015 | Sanchez et al. | |
| 9,151,995 B2 | 10/2015 | Tseng et al. | |
| 9,396,599 B1 | 7/2016 | Malhotra | |
| 9,487,139 B1* | 11/2016 | Ishida | B60W 50/14 |
| 9,514,629 B2 | 12/2016 | Chen et al. | |
| 9,558,520 B2 | 1/2017 | Peak et al. | |
| 9,587,952 B1 | 3/2017 | Slusar | |
| 9,723,469 B2 | 8/2017 | Truong et al. | |
| 9,734,685 B2 | 8/2017 | Fields et al. | |
| 9,762,601 B2 | 9/2017 | Truong et al. | |
| 9,816,827 B1 | 11/2017 | Slusar | |
| 9,845,048 B1 | 12/2017 | Tseng et al. | |
| 10,019,904 B1 | 7/2018 | Chan et al. | |
| 10,026,309 B1 | 7/2018 | Nepomuceno et al. | |
| 2001/0021667 A1 | 9/2001 | Fujimoto et al. | |
| 2009/0002141 A1 | 1/2009 | Rinaldi | |
| 2009/0037088 A1* | 2/2009 | Taguchi | B60W 30/095 701/117 |
| 2009/0189373 A1 | 7/2009 | Schramm et al. | |
| 2011/0161116 A1 | 6/2011 | Peak et al. | |
| 2011/0213628 A1 | 9/2011 | Peak et al. | |
| 2011/0260848 A1 | 10/2011 | Rodriguez Barros et al. | |
| 2012/0065858 A1 | 3/2012 | Nickolaou et al. | |
| 2012/0123806 A1 | 5/2012 | Schumann, Jr. et al. | |
| 2012/0135382 A1 | 5/2012 | Winston et al. | |
| 2012/0166229 A1 | 6/2012 | Collins et al. | |
| 2012/0194356 A1 | 8/2012 | Haines et al. | |
| 2012/0224062 A1 | 9/2012 | Lacoste et al. | |
| 2012/0236319 A1 | 9/2012 | Gotou et al. | |
| 2013/0147638 A1 | 6/2013 | Ricci | |
| 2013/0219318 A1 | 8/2013 | Schreiber et al. | |
| 2014/0005907 A1 | 1/2014 | Bajpai | |
| 2014/0118130 A1 | 5/2014 | Chang et al. | |
| 2014/0276090 A1 | 9/2014 | Breed | |
| 2014/0350970 A1 | 11/2014 | Schumann, Jr. et al. | |
| 2015/0104071 A1 | 4/2015 | Martin et al. | |
| 2015/0106010 A1 | 4/2015 | Martin et al. | |
| 2015/0197248 A1 | 7/2015 | Breed et al. | |
| 2015/0198951 A1* | 7/2015 | Thor | B60W 10/04 701/23 |
| 2015/0203035 A1 | 7/2015 | Watanabe | |
| 2016/0009252 A1 | 1/2016 | Jeong | |
| 2016/0050315 A1* | 2/2016 | Malhotra | H04M 3/436 455/414.1 |
| 2016/0068156 A1* | 3/2016 | Horii | B60W 30/00 701/28 |
| 2016/0071418 A1 | 3/2016 | Oshida et al. | |
| 2016/0163217 A1 | 6/2016 | Harkness | |
| 2016/0259341 A1 | 9/2016 | High et al. | |
| 2016/0362118 A1 | 12/2016 | Mollicone et al. | |
| 2016/0373473 A1 | 12/2016 | Truong et al. | |
| 2017/0028907 A1 | 2/2017 | Chen | |
| 2017/0032673 A1* | 2/2017 | Scofield | G08G 1/0112 |
| 2017/0132914 A1 | 5/2017 | Dannat et al. | |
| 2017/0138108 A1 | 5/2017 | Kothari | |
| 2017/0174221 A1* | 6/2017 | Vaughn | B60W 40/09 |
| 2017/0218678 A1 | 8/2017 | Kothari | |
| 2017/0228604 A1* | 8/2017 | Ferguson | G06K 9/00798 |
| 2017/0235305 A1* | 8/2017 | Jung | B60W 40/072 701/23 |
| 2017/0236416 A1 | 8/2017 | Dannat et al. | |
| 2017/0334459 A1* | 11/2017 | McNew | B60W 50/14 |
| 2017/0371339 A1 | 12/2017 | Charette et al. | |
| 2018/0072271 A1 | 3/2018 | Yiwei et al. | |
| 2018/0081357 A1 | 3/2018 | Datta Gupta et al. | |

OTHER PUBLICATIONS

Highway Performance Monitoring System Traffic Data for High Volume Routes: Best Practices and Guidelines Final Report (Sep. 8, 2004).

Roadway Information Database (RID), Iowa State University, Center for Transportation Research and Education, downloaded from the Internet at: <http://www.ctre.iastate.edu/shrp2-rid/rid.cfm> (2014).

Sayed et al., Evaluating the Safety Benefits of the Insurance Corporation of British Columbia Road Improvement Program using a Full Bayes Approach, Transportation Research Board 2016 Annual Meeting (Nov. 15, 2015).

Shah, Accident Heat Map for Chicago (2015).

Map of Detroit—Claims at Intersections (May 2018).

* cited by examiner

254

700

SYSTEM FOR ADJUSTING AUTONOMOUS VEHICLE DRIVING BEHAVIOR TO MIMIC THAT OF NEIGHBORING/SURROUNDING VEHICLES

CROSS-REFERENCE TO RELATED APPLICATIONS

This application claims priority to and benefit of: (1) U.S. Provisional Application Ser. No. 62/321,005, which was filed on Apr. 11, 2016 and is titled "Device for Detecting and Visualizing High-Risk Intersections and Other Areas;" (2) U.S. Provisional Application Ser. No. 62/321,010, which was filed on Apr. 11, 2016 and is titled "Analyzing Auto Claim and Vehicle Collision Data to Identify Hazardous Areas and Reduce Vehicle Collisions;" (3) U.S. Provisional Application Ser. No. 62/340,302, which was filed on May 23, 2016 and is titled "Analyzing Auto Claim and Vehicle Collision Data to Identify Hazardous Areas and Reduce Vehicle Collisions;" and (4) U.S. Provisional Application Ser. No. 62/401,116, which was filed on Sep. 28, 2016 and titled "System for Adjusting Autonomous Vehicle Driving Behavior to Mimic that of Neighboring/Surrounding Vehicles;" the entire disclosures of which are expressly incorporated herein by reference.

TECHNICAL FIELD

This disclosure relates to a device for detecting and visualizing high-risk intersections and other areas for vehicle drivers.

BACKGROUND

Drivers and passengers assume a certain degree of risk of injury or property damage when travelling by vehicle. This risk may be mitigated by reducing or eliminating certain contributing factors. For example, a driver may avoid risky behavior, such as driving while intoxicated, driving while tired, or driving while texting. As another example, a driver may mitigate the risk of serious injury by driving a car with safety features such airbags, seatbelts, and antilock brakes.

However, certain risk factors may not be mitigated. For example, the very nature of a vehicle may present certain inherent risks. A typical car may weigh thousands of pounds and may not always maneuver or stop quickly. When travelling at even a moderate speed, a collision may result in serious damage to the vehicle and serious injury to the occupants. Further, a driver may have no control over perhaps the greatest risk factor involved with driving: other drivers.

In some situations, environmental factors may contribute to the relative riskiness or safety of an area. For example, a driver approaching a one-lane bridge in a valley between two hills may not see the bridge until the vehicle has crested the hill. If the distance between the hill crest and the bridge is short, the driver may have little time to react if a second driver is approaching the bridge from the other direction. A driver may have little to no control over these environmental factors.

Moreover, environmental factors contributing to the riskiness of an area may not always be readily apparent, observable, or quantifiable. For example, even if a civil engineer identifies a number of one-lane bridges as potentially dangerous, she may have no way of quantifying how risky these one-lane bridges are relative to one another. Moreover, the engineer may overlook a two-lane bridge that is seemingly safe, but which is in actuality riskier than many of the identified one-lane bridges. Because the environmental factors contributing to risk may not always be apparent, observable, or quantifiable, these environmental risk factors may go unnoticed. Thus, engineers and government officials may never identify certain high-risk areas, much less identify solutions to mitigate the risk and improve the safety of the areas for vehicle drivers and passengers.

SUMMARY

This specification discloses systems and methods for identifying the riskiness of areas (such as roads, intersections, bridges, road segments, parking lots, and other transportation infrastructure) for vehicles and occupants. In particular, a risk index may be calculated for a number of areas. These risk indices may be compared to one another, enabling a comparison of the relative riskiness of the areas. The riskiest areas may be categorized as high priority. This prioritization may be especially beneficial in light of the fact that funds for infrastructure construction are often limited. Thus, the disclosed systems and methods may be utilized to confidently identify roads, intersections, or bridges most in need of redesign or additional construction (e.g., bypasses, additional stop lights, lane expansion, etc.).

In one aspect, a computer-implemented method may include calculating a risk index. Calculating the risk index may include any one or more of: (i) calculating a number of expected collisions over a time period; (ii) determining a number of observed collisions for a particular area over the time period; (iii) estimating an aggression level of a proximate vehicle; and/or (iv) calculating the risk index based upon a comparison between the number of expected collisions and the number of observed collisions and/or based on the estimated aggression level of the proximate vehicle. The number of expected collisions may be calculated based upon (a) historical traffic data for the particular area, and/or (b) historical traffic data for multiple areas and corresponds to an average risk for the multiple areas. In another embodiment, the number of expected collisions may be a function of traffic volume or flow, and/or adjusted for market penetration. The observed collisions may be limited to observations involving vehicles within the market corresponding to the market penetration. In one embodiment, the method further includes generating a risk map based upon the risk index. The risk map may include graphic elements depicting risk indices for a plurality of areas in addition to the particular area. The risk map may be a heat map, and/or may be transmitted to mobile devices via wireless communication or data transmission over one or more radio links or wireless communication channels.

In another aspect, a computer system may include a processor and one or more memory devices storing non-transitory computer readable instructions that when executed cause the processor to calculate a risk index. The instructions may cause the processor to do any one or more of the following: (i) calculate a number of expected collisions over a time period; (ii) determine a number of observed collisions for a particular area over the time period; (iii) estimate an aggression level of a proximate vehicle; and/or (iv) calculate a risk index based upon a comparison between the number of expected collisions and the number of observed collisions and/or based on the estimated aggression level of the proximate vehicle. In one embodiment, the instructions may cause the processor to calculate the number of expected collisions based upon historical traffic data for the particular area. The instructions may cause the processor to calculate the number of expected collisions based upon historical traffic data for multiple areas, and the number of expected collisions may correspond to an average risk for the multiple areas. The instructions may cause the processor to calculate the number of expected collisions as a function of traffic flow, and/or adjust the number of expected collisions for market penetration. The instructions may cause the processor limit the observed collisions to collisions involving vehicles within the market corresponding to the market penetration, and/or further cause the processor to generate a risk map based upon the risk index. In one embodiment, the instructions may cause the processor to generate a risk map including graphic elements depicting risk indices for a plurality of areas in addition to the particular area, and/or generate the risk map as a heat map. The system may include a display device for displaying the risk map, and/or may transmit the risk map to another system or device for display, such as via wireless communication or data transmission over one or more radio links or wireless communication channels.

In another aspect, a computer system may include a means for calculating a risk index. In one embodiment, the means for calculating the risk index may include any one or more of: (i) means for calculating a number of expected collisions over a time period; (ii) means for determining a number of observed collisions for a particular area over the time period; (iii) means for estimating an aggression level of a proximate vehicle; and/or (iv) means for calculating the risk index based upon a comparison between the number of expected collisions and the number of observed collisions and/or based on the estimated aggression level of the proximate vehicle. In one embodiment, the system may include means for calculating the number of expected collisions based upon historical traffic data for the particular area. In another embodiment, system may include a means for calculating the number of expected collisions based upon historical traffic data for multiple areas. The number of expected collisions may correspond to an average risk for the multiple areas. The system may include a means for calculating the number of expected collisions as a function of traffic flow, and/or may include a means for adjusting the number of expected collisions for market penetration. The system may include a means for limiting the observed collisions to collisions involving vehicles within the market corresponding to the market penetration, and/or may further include a means for generating a risk map based upon the risk index. Additionally or alternatively, the system may include a means for generating a risk map including graphic elements depicting risk indices for a plurality of areas in addition to the particular area. The system may include a means for generating the risk map in the form of a heat map.

In another aspect, a system for controlling an autonomous vehicle may comprise: a sensor that is mounted to an autonomous vehicle and that detects a characteristic of a proximate vehicle; and a controller for the autonomous vehicle configured to: (i) analyze the characteristic to estimate an aggression level of the proximate vehicle; (ii) adjust an aggression factor based on the estimated aggression level; and (iii) control the autonomous vehicle utilizing the aggression factor. The sensor may be any of: a motion sensor, an audio sensor, and/or a laser sensor. The characteristic may be acceleration, speed, and/or a swerve factor. The controller may be configured to adjust a rate of acceleration or deceleration of the autonomous vehicle based on the aggression factor.

In another aspect, a method for controlling an autonomous vehicle may comprise: detecting, by a sensor mounted to an autonomous vehicle, a characteristic of a proximate vehicle; analyzing the characteristic to estimate an aggression level of the proximate vehicle; adjusting an aggression factor based on the estimated aggression level; and controlling the autonomous vehicle utilizing the aggression factor. Detecting the characteristic may comprise detecting motion of the proximate vehicle and/or detecting audio associated with the proximate vehicle. The characteristic may be speed, acceleration, and/or a swerve factor. Controlling the autonomous vehicle utilizing the aggression factor may comprise adjusting, based on the aggression factor, a rate of acceleration or deceleration utilized by a controller of the autonomous vehicle.

In another aspect, a system for controlling an autonomous vehicle may comprise: a means for detecting a characteristic of a proximate vehicle that is proximate to an autonomous vehicle; a means for analyzing the characteristic to estimate an aggression level of the proximate vehicle; a means for adjusting an aggression factor based on the estimated aggression level; and a means for controlling the autonomous vehicle utilizing the aggression factor. The means for detecting the characteristic may comprise a motion sensor, an audio sensor, a laser sensor, and/or a means for detecting audio associated with the proximate vehicle. The means for controlling the autonomous vehicle utilizing the aggression factor may comprise adjusting, based on the aggression factor, a rate of acceleration or deceleration utilized by a controller of the autonomous vehicle.

This summary is provided to introduce a selection of concepts that are further described below in the detailed description. Certain embodiments may include features and advantages not described in this summary. Further, certain embodiments may omit one or more (or all) of the features and advantages described in this summary.

BRIEF DESCRIPTION OF THE DRAWINGS

Each of the figures described below depicts one or more aspects of the disclosed system(s) and/or method(s), according to an embodiment. Wherever possible, the detailed description refers to the reference numerals included in the following figures.

DETAILED DESCRIPTION

This specification discloses systems and methods for calculating a risk index for one or more areas (e.g., roads, intersections, bridges, parking lots, road segments or portions, and/or other transportation infrastructure). Risk indices for various areas may be compared to one another, enabling comparison of the relative riskiness of the areas. These risk indices may be utilized to evaluate the riskiness of various transportation infrastructures and/or to identify infrastructures most in need of safety improvements. For example, in some embodiments, a risk map may be generated to visually depict one or more risk indices for areas within a depicted region. The risk map may be used to quickly identify the riskiest area(s) in the region.

Exemplary Method 100 for Calculating Risk Index and Generating a Risk Map

Figure 1:
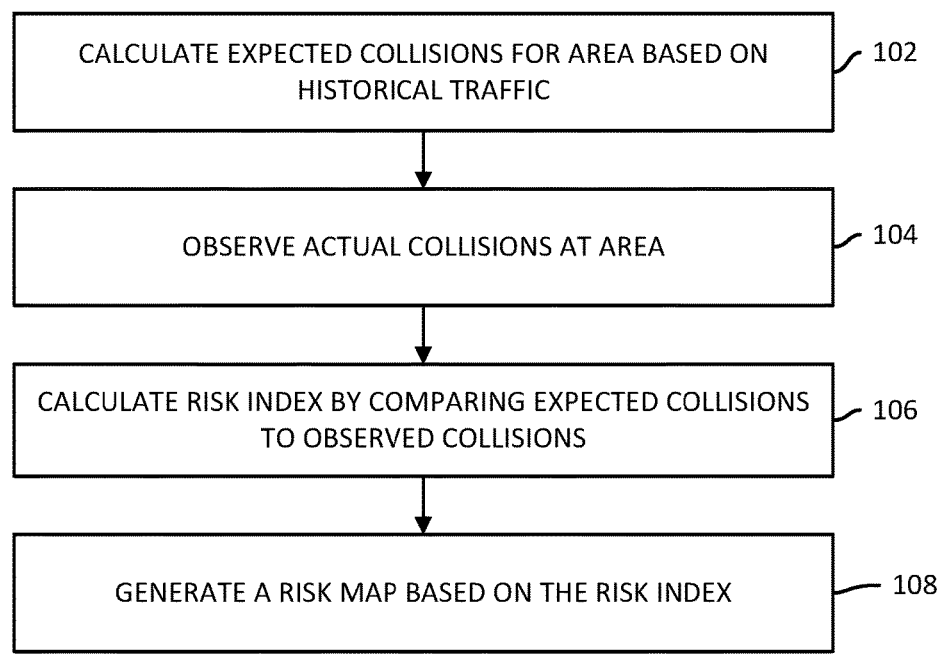
FIG. 1 illustrates an exemplary computer-implemented method for calculating a risk index and generating a risk map.

FIG. 1 illustrates an exemplary computer-implemented method 100 for calculating a risk index and generating a risk map according to one embodiment. The method 100 may be implemented, in whole or in part, by the system 200 shown in FIG. 2. The method 100 may be saved to a memory as one or more instructions or routines.

The method 100 may begin when expected collisions are calculated (block 102). The expected collisions may be calculated based upon historical traffic data. In one embodiment, historical traffic data (including historic auto insurance claim data and/or vehicle collision data) for a particular area of interest may be analyzed, and an average number of collisions may be calculated and used for the expected collisions. For example, historically, area x may average of 10 collisions per month. Thus, the expected collisions for area x may be 10 collisions per month. In some embodiments, historical traffic data for multiple areas may be analyzed, and the average number of collisions may be calculated for all of the areas and used for the expected collisions. For example, historically, five different areas (including area x) may average a total of 62 collisions per month. Thus, the expected collisions for any given area within the region (e.g., including area x) may be 12.4 collisions per month.

In some embodiments, the expected collisions may be a function of traffic volume. For example, a collision rate per 100 vehicles of traffic might be calculated based upon historical data (including auto insurance claim data and/or vehicle collision data) for a single area or for multiple areas (e.g., 5.5 collisions per 100 vehicles of traffic). Traffic volume for the area of interest (e.g., area x) may be observed (e.g., 200 vehicles per month). Then, the expected collisions for the area of interest may be calculated (e.g. area x may expect 11 collisions per month). In one embodiment, the number of expected collisions may be adjusted for market penetration. For example, if an insurance company has 25% market penetration, the insurance company may calculate an expected collisions value of 2.75 (i.e., 25% of 11), representing the expected number of collisions that involve vehicles insured by the insurance company. As another example, a vehicle manufacturer may adjust for market penetration to identify an expected number of collisions that involve vehicles of a particular make and/or model.

Actual collisions may be observed (block 104). Insurance claims data may be utilized to identify the actual collisions that have occurred at the area of interest. For example, an analysis of insurance claims data may reveal that insurance claims have been filed on 15 collisions that have occurred at the area x (discussed in the example above) over the course of a month. When compared to the expected collision value of 11 calculated in the example above, area x experienced more collisions than expected.

A risk index may be calculated by comparing the expected collisions to the observed collisions (block 106). For example, the number of observed collisions may be divided by the number of expected collisions, where a risk index value greater than one indicates that the area is riskier than expected, and a risk index value less than one indicates that the area is less risky than expected. Using the numbers from the example above, area x may be determined to have a risk index of 1.36 (i.e., the result of 15/11).

A risk map may be generated based, at least in part, on the calculated risk index (block 108). The risk map may be displayed by the system 200. The risk map may depict graphical elements representing risk indices for areas included in the risk map. For example, the risk map may include colored circles indicating a risk level, corresponding to calculated risk indices, associated with the areas included in the map.

Calculated risk indices may be compared to one another, enabling an evaluation of the relative riskiness of the areas associated with the risk indices. The generated risk map enables a user to easily perform this evaluation. As previously noted, this risk evaluation may be especially useful for civil engineers and government officials interested in identifying infrastructure most in need of safety improvements. Further, the method 100 may be useful for insurance companies. For example, insurance companies may adjust rates based upon how often a particular driver drives through a particular area with a high risk index. This rate adjustment may be based upon an estimate, or may be implemented as part of a dynamic rate policy. For example, an insurance company may implement a dynamic rate responsive to a driver's real-time behavior and routing, and to reward risk averse drivers. Thus, the rate may dynamically go up or down as a driver drives through areas with high or low risk indices, respectively.

Exemplary System 200

Figure 2:
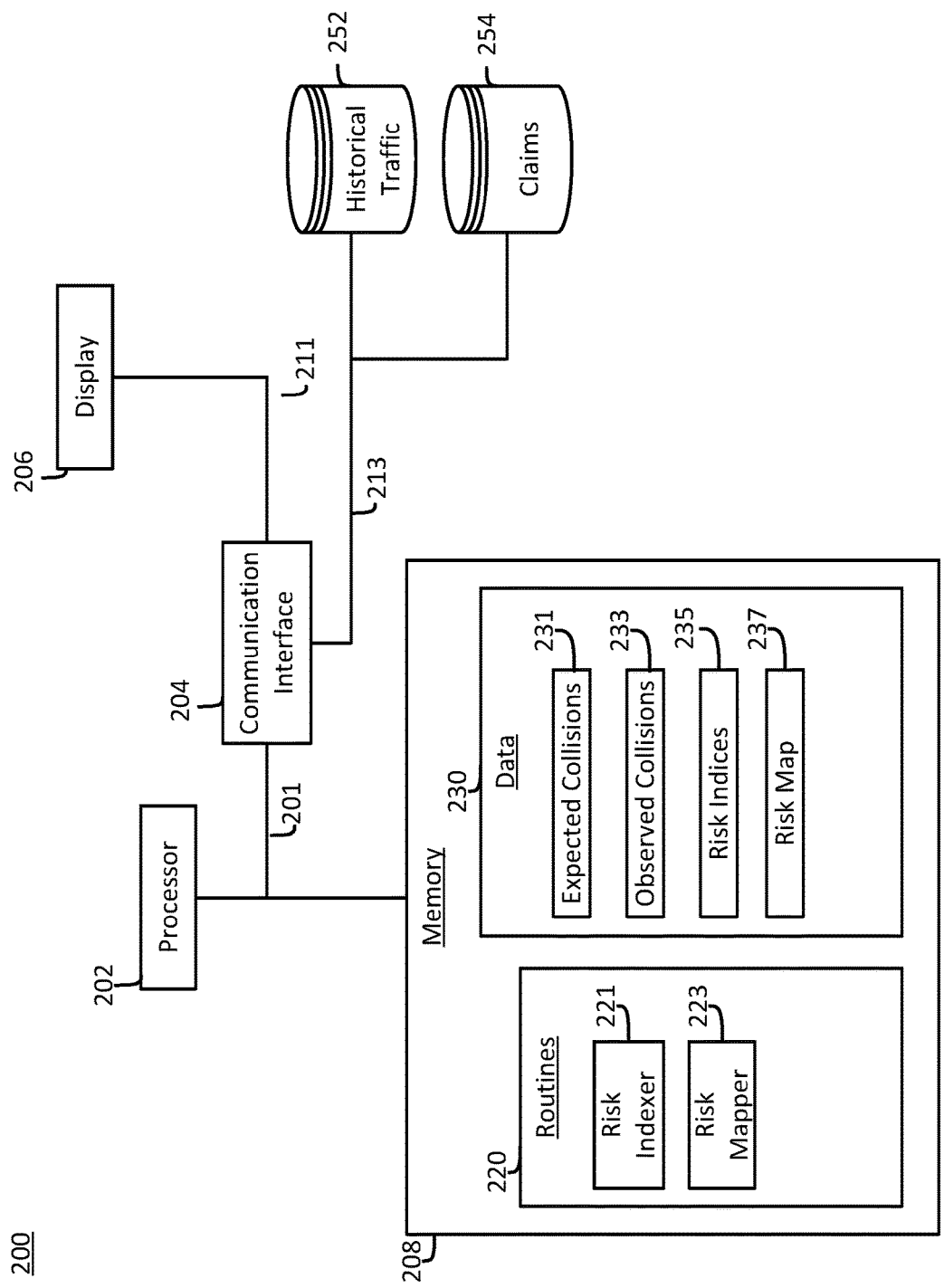
FIG. 2 illustrates an exemplary computer system according to one embodiment.

FIG. 2 illustrates an exemplary computer system 200 according to one embodiment. The system 200 may be an electronic device such as a general purpose computer or mobile device. The system 200 may include any one or more of: a bus 201, processor 202, a communication interface 204, display 206, and/or a memory 208. The memory 208 may include one or more routines 220 and/or data 230. The routines 220 may include a risk indexer routine 221 and/or a risk mapper routine 223. The data 230 may include expected collision data 231, observed collision data 233, risk index data 235, and/or risk map data 237. In one embodiment, the data 230 may include one or more of: historical traffic data 252; and/or claims data 254. In one embodiment, the system 200 may be communicatively coupled, by way of one or more communication links 213, to one or more servers having access to databases storing the data 252 and/or data 254.

The bus 201 may be a data bus (for carrying data), an address bus (for determining where the data should be sent), a control bus (for determining the operation to execute), or some combination thereof.

The processor 202 may be communicatively coupled to the communication interface 204 and/or memory 208 by way of the bus 201. The processor 202 may be any suitable processor or microprocessor, and is communicatively connected to the communication interface 204 and memory 208 by way of the bus 201. The processor 202 may be configured to fetch and execute instructions stored to the memory 208. In one embodiment, the processor 202 may be part of a chipset, which may include, for example, a memory controller (for the memory 208) and/or an I/O controller (for the communication interface 205). In some embodiments, the processor 202 may include multiple processors.

The communication interface 204 may be communicatively coupled to the processor 201 by way of the bus 201.

The communication interface 204 may be communicatively coupled to the display 208 (by way of a link 211) and/or to one or more servers (by way of the link(s) 213) having access to one or more of: the historical traffic database 252; and/or the claims database 254. The communication interface 204 may include various interfaces, such as an input/output (I/O) interface, a network interface, a peripheral device interface, etc.

The display 206 may be an electronic display device communicatively connected to the communication interface 204 by way of the link 211. In one embodiment, the link 211 may be a wired link (e.g., an RGB, HDMI, or DVI link). In one embodiment, the link 211 is a wireless link. Example displays 206 include a monitor, a television screen, a projector, etc.

The memory 208 may be communicatively coupled to the processor 202 by way of the bus 201. The memory 208 may be communicatively coupled to the bus 201, enabling the processor 202 to access the memory 208. The memory 208 may be coupled to the bus 201 via a memory interface (e.g., a memory controller).

The memory 208 may store expected collision data 231 representing an expected number of collisions. The data 231 may include data representing a number of crashes that may be expected for any one or more of the following: a particular area (e.g., an intersection, street, portion of a street, parking lot, etc.), a particular time, such as the time of year (e.g., a particular date, month, and/or season), a day of the week (e.g., Sunday-Saturday); a time of day (e.g., a particular time or a general time, such as "evening" or "morning"); a volume of traffic (e.g., a number of cars per hour); etc. In some embodiments, the processor 202 generates some or all of the data 231 based upon the historical traffic data 252 and/or the claims data 254.

For example, the system 200 may acquire historical traffic data 252 for a number of comparable areas near the area of interest. For each comparable area, the acquired historical traffic data 252 may include a number of collisions for a particular time period and/or a traffic volume. The processor 202 may calculate a "per car" collision rate for each comparable area, and may rely on an average of these "per car" collision rates to estimate the expected number of collisions for the area in question (e.g., based upon the expected traffic volume of the area in question).

The memory 208 may store observed collision data 233. In some embodiments, the system 200 may acquire some or all of the data 233 from a server communicatively connected to the communication interface 204 (e.g., a server coupled to the databases 252 and/or 254).

The memory 208 may store risk index data 235. The risk index data 235 represents one or more risk indices calculated by the processor 202.

The memory 208 may store risk map data 237. The risk map data 237 represents a risk map generated by the processor 202. The data 237 may include graphic elements associated with certain areas. Each graphic element may indicate a risk index associated with an area. For example, certain colors, shapes, or sizes of the graphic elements may indicate a higher or lower risk. An area with a high risk index may be encompassed by a large, red circle, for example, while an area with a low risk index may be encompassed by a smaller, blue circle. Various other shapes or symbols may be utilized to indicate risk index (e.g., triangles, hexagons, exclamation points, etc.). In some embodiments, the graphic elements may be names that are, e.g., colored or sized to correlate to the risk index. For example, the graphic elements may be street names (e.g., "Broadway") or intersection names (e.g., "Broadway and Main").

In some embodiments, a graphic element may be a depiction of an area itself, colored or sized to correlated to the risk index. For example, if the intersection of Broadway and Main has a high risk index (e.g., above 1), the graphic element may be a depiction of Broadway and Main (e.g., graphics of the intersecting streets), colored red and/or enlarged, for example. If the intersection of Broadway and Main has a low risk index (e.g., below 1), the graphic element may be a depiction of Broadway and Main, colored blue and shrunk relative to a normal size, for example.

Figure 3:
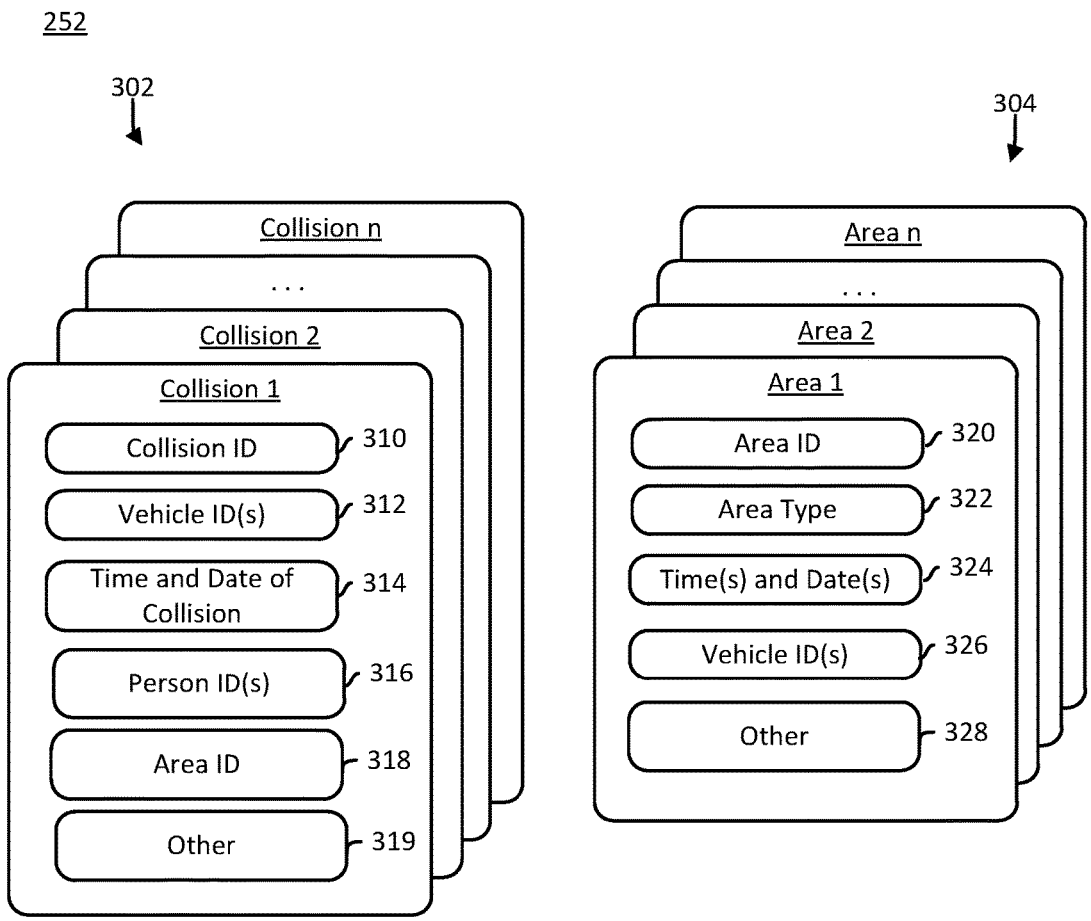
FIG. 3 illustrates exemplary historical traffic data according to one embodiment.

The historical traffic data 252 may be stored at a database managed by a server (not shown) communicatively coupled to the system 200. In some embodiments, the historical traffic data 252 may be stored at the memory 230. The data 252 may include data representing historical traffic statistics. For example, the data 252 may include data regarding traffic volume and/or data regarding collisions for certain areas. Example historical traffic data 252 is shown in FIG. 3.

Figure 4:
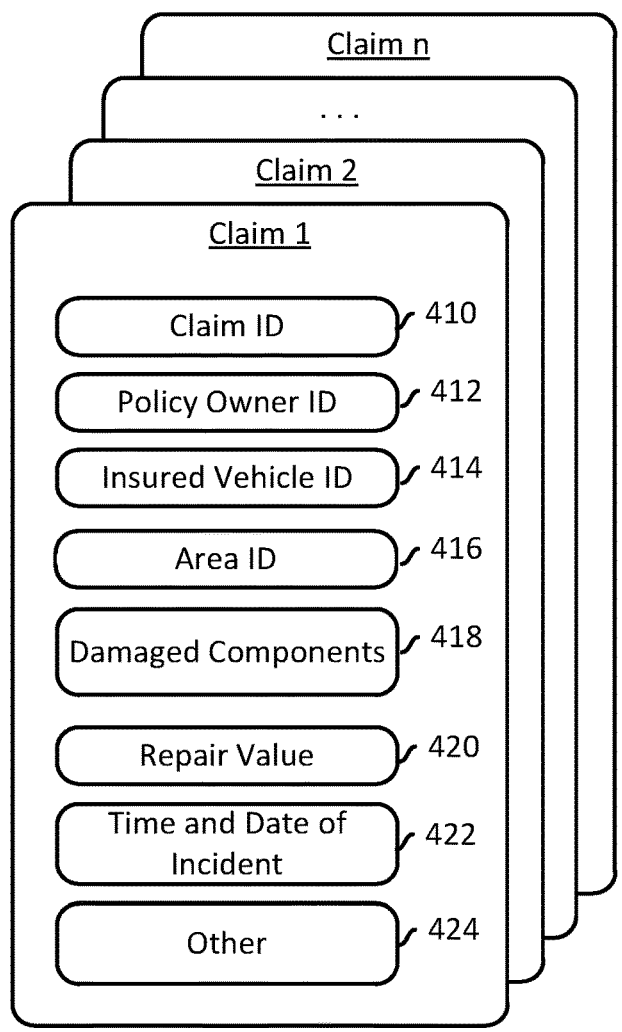
FIG. 4 illustrates exemplary claims data according to one embodiment.

The claims data 254 may be stored at a database managed by a server (not shown) communicatively coupled to the system 200. In some embodiments, the claims data 255 may be stored at the memory 230. The claims data 254 generally represents insurance claims filed by insurance policy owners. The data 254 may identify a particular incident/collision, policy owners, involved vehicles, an area where the incident/collision occurred, property involved, repair and/or replacement costs and/or estimates, a time and date of the incident, and/or various other information. Example claims data 254 is shown in FIG. 4.

In example operation, the processor 202 may execute the risk indexer 221 to calculate a risk index and/or may execute the risk mapper 223 to generate a risk map (which may be saved to the memory 208 as risk index data 235 and risk map data 237, respectively).

Exemplary Operation of the Risk Indexer 221

In some embodiments, the risk indexer 221 may calculate a risk index by performing one or more of the following operations: (i) calculating expected collisions for a given area(s) time period(s), and/or traffic volume; (ii) receiving data identifying observed collisions for an area of interest during a particular time period; and/or (iii) comparing the expected collisions to the observed collisions.

Figure 5:
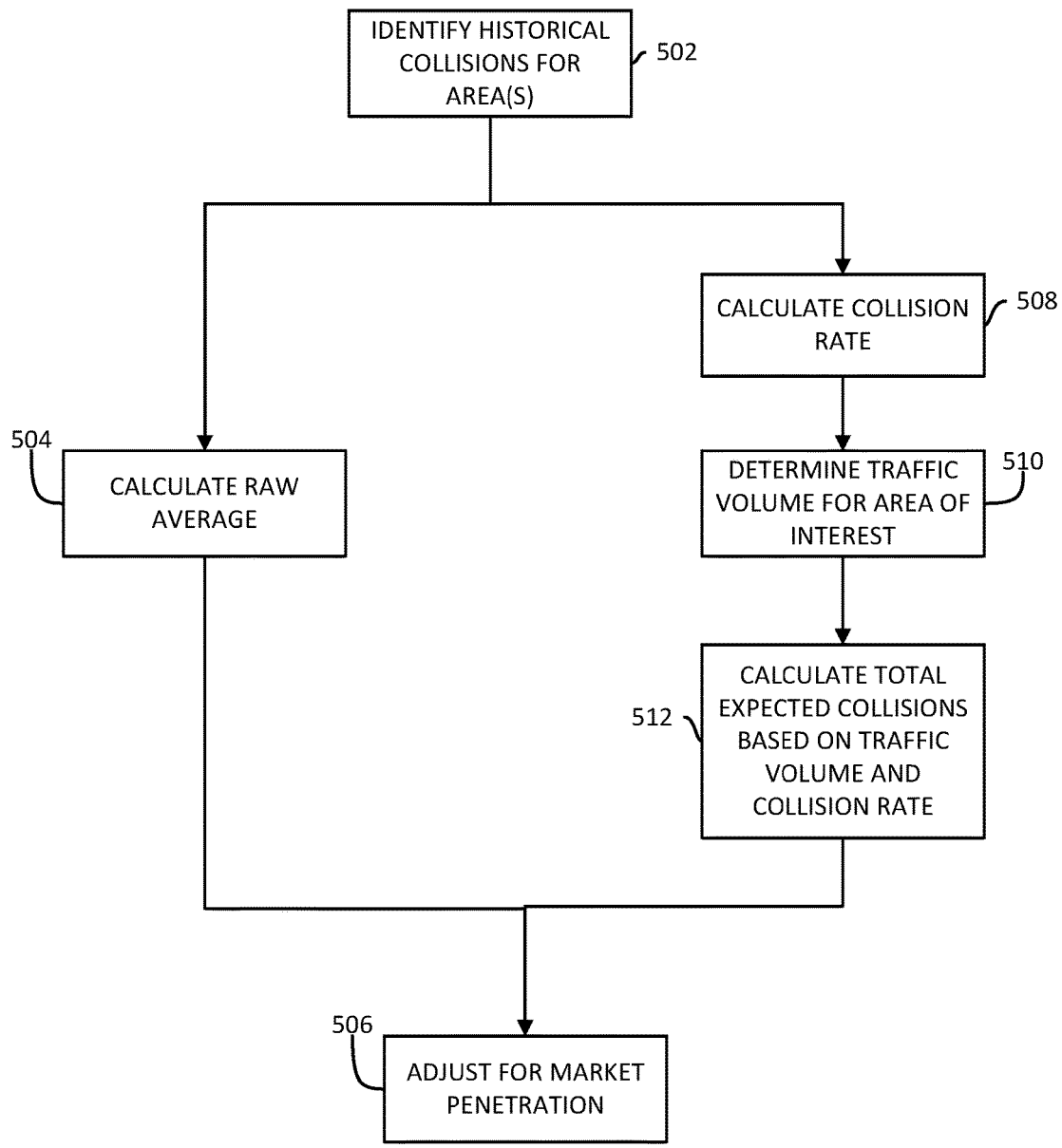
FIG. 5 illustrates an exemplary computer-implemented method for calculating expected collisions according to one embodiment.

First, the processor 202 may calculate expected collisions, which may involve analyzing historical traffic data 252. FIG. 5 illustrates an exemplary computer-implemented method for calculating expected collisions. The expected collisions may be calculated for a typical time period (e.g., a typical week, month, etc.) or for a specific time period (e.g., January 2017). The calculated expected collisions may be saved to the memory 208 as the data 231.

Second, the processor 202 may receive data identifying observed collisions for the particular area. In some embodiments, the received data may identify a total number of collisions that occurred at the particular area. In some embodiments, the received data may be limited to collisions observed by a particular entity. For example, in some embodiments, the processor 202 may transmit a query to a server managing the claims database 254. In some embodiments, the claims database 254 only includes data on collisions involving policy holders associated with a particular insurance company. In some embodiments, the claims database 254 may include data on collisions involving policy holders and/or vehicles associated with multiple companies. The processor 202 or server may identify from the claims data 254 collisions that occurred within the area of interest and within the particular time period. The number of identified collisions resulting from the query may be saved to the memory 208 as observed collision data 233. In an embodiment, the observed collision data is received from an observer system. The observer system may include one or more computing devices, sensors, and/or cameras configured to monitor the particular area for collisions.

Third, the processor 202 may compare the expected collisions to the observed collisions to calculate the risk index. For example, in some embodiments, the processor 202 may divide the number of observed collisions by the number of expected collisions. The processor 202 may store the resulting quotient to the memory 208 as risk index data 235 for the particular area. In such embodiments, a risk index value equal to one may suggest that an area is about as dangerous as expected; a risk index value greater than one may suggest that the area is more risky than expected; and a risk index value less than one may suggest that the area is less risky than expected.

For example, in a hypothetical scenario, the expected collision data 231 may indicate that 100 collisions were expected for the month of January 2014 at the intersection of Main Street and Broadway. Further the observed collision data 233 may indicate that 110 collisions were observed during the month of January 2014 at the intersection of Main Street and Broad. Thus, the processor may calculate the risk index to be 110/100, or 1.1. A risk index of 1.1 may suggest that the intersection of Main Street and Broadway is riskier than expected.

Furthermore, in yet another hypothetical example, the expected collisions data 231 may indicate that 20 collisions were expected in the month of February at intersections in the presence of snow and ice on the road. Further, the observed collisions data 233 may indicate that 40 collisions have so far been reported at the intersection of Main Street and Broadway during the month of February when snow and ice have also been reported. Thus, the processor 210 may calculate the risk index to be 40/20, or 2.0 when snow and ice are present. A risk index of 2.0 may suggest that the intersection of Main Street and Broadway is riskier when snow and ice are present.

In some embodiments, the risk index may be calculated differently. For example, in some embodiments, the processor 202 may subtract the observed collisions from the expected collisions and may store the result as the risk index. In such embodiments, a value of 0 may suggest that an area is about as risky as expected; a positive value may suggest that an area is less risky than expected; and a negative value may suggest that the area is riskier than expected.

The calculated risk index or indices may be utilized to evaluate the riskiness of an area or areas. As explained below, in some embodiments, the system 200 may generate a risk map to visually depict one or more risk indices for areas within a depicted region.

Exemplary Operation of the Risk Mapper 223

In some embodiments, the risk mapper 223 may generate a risk map by performing one or more of the following operations: (i) identifying a risk map area; (ii) identifying one or more risk indices associated with sub-areas within the risk map area; and/or (iii) generating a risk map that may include or is overlaid with graphic elements depicting the identified risk indices.

First, the processor 202 may identify a risk map area. This may be responsive to user input received via one or more input devices coupled to the communication interface 204. For example, a user may specify a particular zip code or city. In some embodiments, the user may specify a particular area (e.g., a landmark, intersection, building, parking lot, address, etc.) and a radius.

Second, the processor 202 may identify one or more risk indices associated with sub-areas within the risk map area. For example, if the user specified a zip code of 60606, the processor may analyze the risk index data 235 to identify risk indices associated with areas within zip code 60606.

Figure 6:
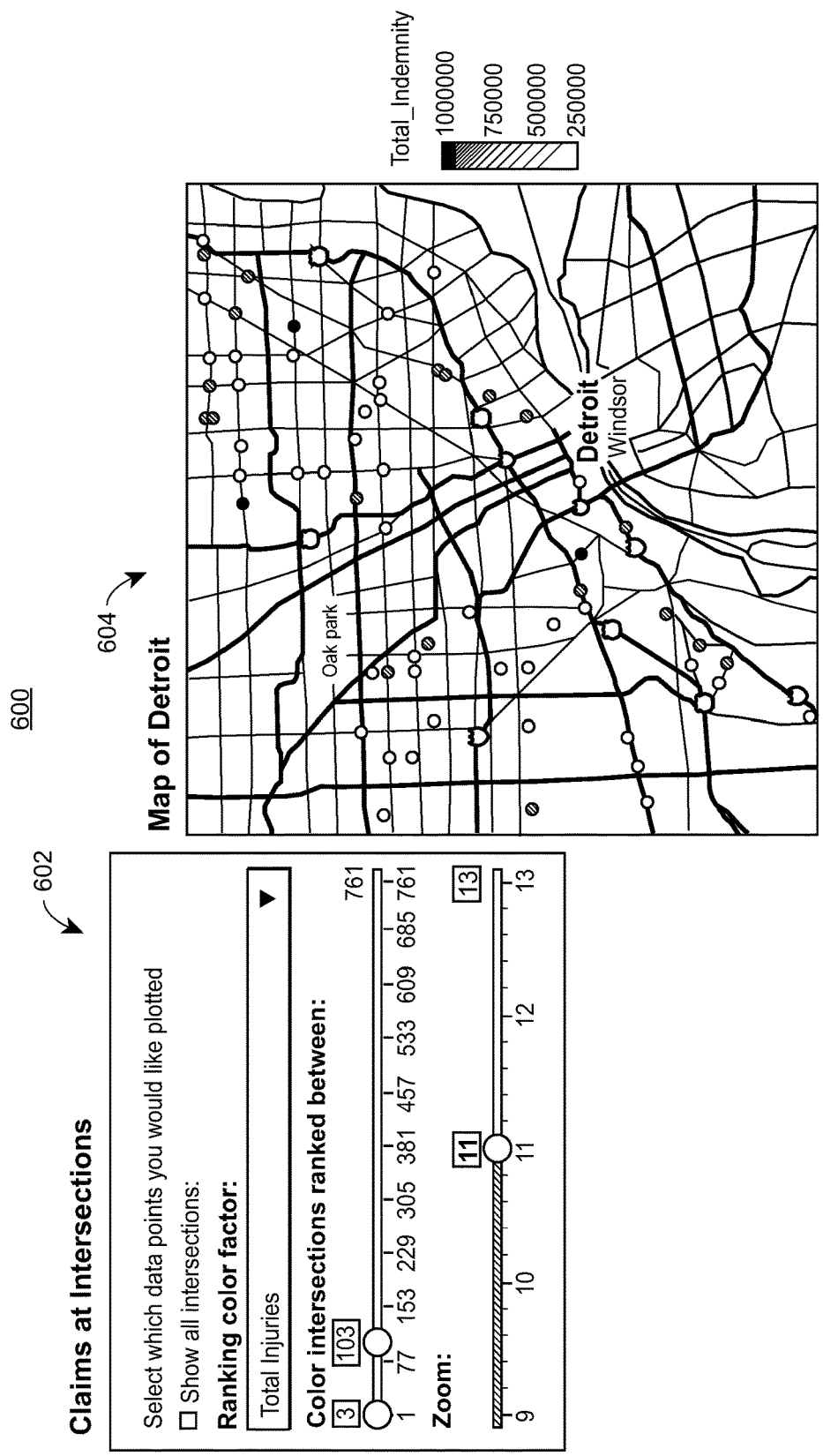
FIG. 6 illustrates an exemplary user interface according to one embodiment.

Third, the processor 202 may generate a risk map that may include or that is overlaid with graphic elements corresponding to the identified risk indices. The processor 202 may store the risk map to the memory 208 as risk map data 237. In some embodiments, the processor 202 may display the risk map via the display 206. The risk map may be depicted as a "heat map," using various colors, for example, to indicate different levels of risk. An example risk map is shown in FIG. 6.

A user may rely on the displayed risk map to evaluate the risk of various areas depicted within the map area. For example, a civil engineer may rely on the risk map to identify areas that potentially need infrastructure improvement. For example, a high-risk area may need additional stop lights or street lights to reduce the number and/or severity of collisions at the area. In some instances, a driver or potential driver may rely on the risk map to choose less risky routes.

Exemplary Historical Traffic Data 252

FIG. 3 illustrates example historical traffic data 252, according to an embodiment (also shown in FIG. 2). The historical traffic data 252 may include collision data 302 and/or area data 304, and may include historic or current auto insurance claim data.

The collision data 302 may include records for multiple collisions. For each collision, the collision data 302 may include a record of relevant information. Each collision record may include or reference one or more of: a collision ID 310 unique to the collision; vehicle ID(s) 312 identifying the vehicle(s) involved in the collision; time and date data 312 identifying when the collision occurred; person ID(s) 316 identifying people involved in the collision (e.g., policy holders); an area ID 318 identifying an area of the collision; and/or other data 319. The system 200 may utilize the collision data 302, e.g., to identify a number of collisions for a particular area within a particular time period.

The area data 304 may include records for multiple areas. For each area, the area data 304 may include a record of relevant information. Each area record may include or reference one or more of: an area ID 320 unique to the area; an area type 322 identifying an area type (e.g., bridge, road, intersection, etc.); times and/or dates 324 of observed traffic in the area; vehicle ID(s) 326 identifying vehicles observed in the area; and/or other data 328. The system 200 may utilize the area data 304 to, e.g., calculate a traffic volume for a given area for a time period (e.g., over a week, month, year, etc.).

Exemplary Claims Data 254

FIG. 4 illustrates example claims data 254, according to one embodiment (also shown in FIG. 2). The claims data 254 may include records for multiple insurance claims filed by policy holders.

For each claim, the claims data 254 may include a record of relevant information. Each claim record may include or reference one or more of: a claim ID 410 unique to the claim; a policy owner ID 412 unique to the policy holder who filed the claim; a vehicle ID 414 unique to the vehicle owned by the policy holder; an area ID 416 unique to the area where the incident or collision occurred; damaged components data 418 identifying the property damage resulting from the incident or property; a repair or replacement value 420; time and date information 422; and/or other information 424, such as data indicating a number and extent of personal injuries resulting from a vehicle collision and/or data indicating an extent of liability damages resulting from a vehicle collision.

The system 200 may analyze the claims data 254 to identify a number of collisions involving policy holders for a particular area within a particular time period. The system 200 may compare this number of collisions to a market-adjusted expected collisions number, enabling a calculation of a risk index particular to a particular market (e.g., to identify a risk index for an area specific to customers of a particular insurance company, or to identify a risk index for an area specific to vehicles of a particular make and/or model).

Exemplary Method 500 for Calculating Expected Collisions

FIG. 5 illustrates an exemplary computer-implemented method 500 for calculating expected collisions according to one embodiment. The method 500 may be implemented, in whole or in part, by the computer system 200 shown in FIG. 2. The method 500 may be saved to a memory as one or more instructions or routines.

The method 500 may begin when historical collisions are identified for a particular area or areas. In one embodiment, historical collisions are identified for the area of interest. For example, historical traffic data (and/or historical auto insurance claim data) 252 may identify all historical collisions that have occurred at the area of interest. In one embodiment, the system 200 may identify historical collisions that occurred in recent history (e.g., in the last month, the last few months, the last year, the last few years, etc.). The system 200 may then identify an average number of collisions for a time period corresponding to a time period of interest (e.g., a week, month, etc.). As an example, the system may rely on the last five years of data to calculate the average number of collisions per month for the area of interest.

In one embodiment, historical collisions at areas near the area of interest may be identified. For example, a first and second area near the area of interest may be identified and used to calculate the expected collisions. Data for the first and second area of interest may be used in addition to, or in place of, data for the area of interest, depending on the embodiment. By utilizing data from multiple areas within a region, the system 200 may obtain an expected collisions value that represents a regional average. Thus, when observed collisions are eventually compared to the expected collisions to obtain a risk index, the system 200 may determine which areas are more or less risky than might be expected for the region.

In one embodiment, a raw average may be calculated based upon the identified historical collisions (block 504). For example, the first area may have 10 collisions per month over the last five years, the second area may have 20 collisions per month over the last five years, and the area of interest may have six collisions per month over the last five years. The raw average would be 12 collisions per month. The raw average may be used as the expected total collisions value for the area of interest (and for the first and second areas, in some embodiments).

In one embodiment, after historical collisions are identified for the area(s) (block 502), traffic volume is identified for each of the areas and a collision rate is calculated for each area (block 508). For example, the first area may have an average traffic volume of 100 vehicles per month. For the first area, the collision rate would be 10 collisions per 100 vehicles. The second area may have an average traffic volume of 500 vehicles per month. For the second area, the collision rate would be four collisions per 100 vehicles. Thus, despite having more collisions per month, the second area would have a lower collision rate for a given traffic volume. The area of interest may have an average traffic volume of 200 vehicles per month. For the area of interest, the collision rate would be three collisions per 100 vehicles.

An average collision rate may be calculated for each of the areas utilized. For example, the average collision rate for the first area, second area, and area of interest would be 5.6 collisions per 100 vehicles ((10+4+3)/3=5.6).

A traffic volume may be determined for the area of interest (block 510). The traffic volume may be determined by analyzing the historical traffic data 252 shown in FIG. 2. For example, the area of interest may have a traffic volume of 200 vehicles per month.

The total expected collisions for the area may be calculated based upon the determined traffic volume and the collision rate (block 512). For example, if the area of interest has a traffic volume of 200 vehicles per month and the calculated collision rate is 5.6 collisions per 100 vehicles, the total expected collisions for the area during a given month would be 11.2 collisions.

In some embodiments, the system 200 may adjust the total expected collisions for market penetration. For example, an insurance company may be interested in calculating the expected collisions for the area involving vehicles owned by policy holders. In some embodiments, the system 200 may make this calculation using a market penetration value, which represents a percentage of the total market. For example, an insurance company with 30% market penetration insures roughly 30% of the cars on the road for an area of interest. In some embodiments, the system 200 may calculate the market penetration by analyzing the claims data 254 to determine how many policy holder vehicles exist in a given area and by analyzing the historical traffic data 252 to determine a total number of vehicles active in an area. The system 200 may then multiply the resulting market penetration value by the total expected collisions for the area to obtain a market adjusted expected collisions value. For example, given 30% market penetration and a total expected collisions value of 11.2, the market adjusted expected collisions value would be 3.36.

Exemplary User Interface 600

FIG. 6 illustrates an exemplary user interface 600 according to one embodiment. The user interface 600 may be generated based, in part, on the risk map data 237 shown in FIG. 2. The user interface 600 may be displayed via the display 206 shown in FIG. 2. In some embodiments, the user interface 600 may be displayed via other displays. For example, the system 200 may transmit the risk map data 237 to a vehicle computer where the user interface 600 may be rendered. In one embodiment, the user interface 600 may be rendered in a webpage, and may be accessible by a computer having internet access, such as vehicle controller, vehicle navigation unit, and/or mobile device (e.g., smartphone or wearable electronics).

The user interface 600 may include an input interface 602 and a risk map 604. A user may utilize the interface 602 to enter or select selection criteria for displaying risk indices. In the example shown, the interface 602 is displaying risk indices (via color) for areas (intersections in this case) ranked between 3 and 100. Thus, the graphic elements (colored dots in this case) overlaying the risk map 604 correspond to areas having a risk index falling between the third highest risk index (e.g., indicating the third riskiest area) and the 100$^{th}$ highest risk index (e.g., indicating the 100$^{th}$ riskiest area).

In some embodiments, a user may utilize the interface 602 to select a ranking factor. For example, risk may be assessed by any one or more of the following: physical injuries; property damage; and/or indemnity associated with either physical injuries or property damage.

In some embodiments, a user may utilize the interface 602 to select a zoom factor, enabling the user to increase or decrease the size of the region depicted by the risk map 604.

The risk map 604 may be used to quickly identify the riskiest area(s) in the region and a relative risk ranking for the depicted areas. This risk evaluation may be useful for identifying areas most in need of safety improvements. As another example, insurance companies may utilize the user interface 600 and risk map 604 to evaluate risk, which may affect insurance rates for drivers who live or drive in or near risky areas or less risky areas. A driver, for example, who has predominately safe areas near his home and work may be given a lower rate than a driver who has predominately risky areas near his home and work.

Figure 7:
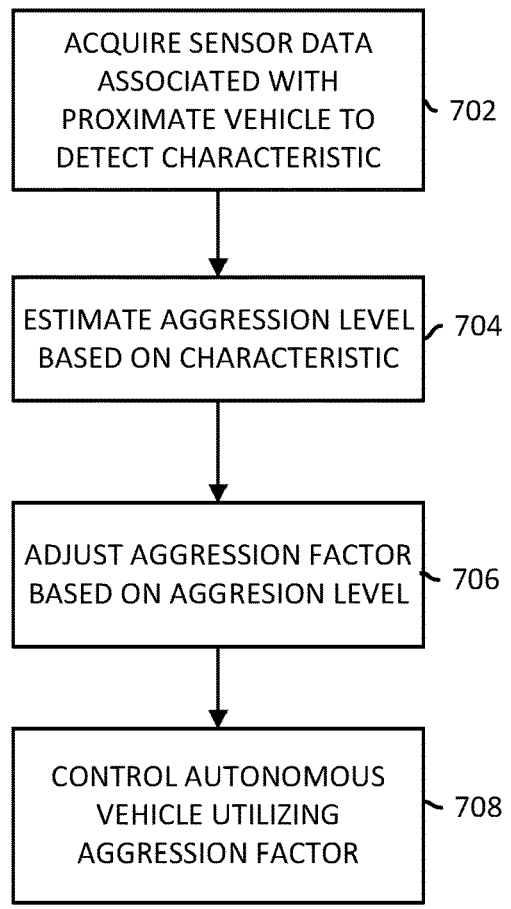
FIG. 7 illustrates an example method for controlling an autonomous vehicle according to one embodiment.

Example Method for Adjusting Autonomous Vehicle Driving Behavior to Mimic that of Neighboring Vehicles FIG. 7 illustrates an exemplary computer-implemented method 700 of controlling an autonomous vehicle. The method 700 may include acquiring sensor or image data associated with surrounding vehicle operation (block 702); analyzing the sensor or image data to estimate an average level of aggressiveness of surrounding vehicles (block 704); adjusting autonomous vehicle aggressiveness to match that of surrounding vehicles (e.g., up to a predetermined threshold or upper limit of acceptable or allowable aggressiveness) (block 706); and/or updating a vehicle risk profile and/or auto insurance discount for the autonomous vehicle based upon the autonomous vehicle having the aggressiveness matching functionality (block 708). The method may include additional, less, or alternate actions, including those discussed elsewhere herein.

In one aspect, the method 700 may include (1) collecting or acquiring, via one or more autonomous vehicle-mounted processors, cameras, transceivers, and/or sensors, data associated with surrounding vehicle operation; (2) determining, via the one or more autonomous vehicle-mounted processors, an average level of aggressive driving or operation of the surrounding vehicles from processor analysis of the data associated with surrounding vehicle operation; and/or (3) adjusting, via the one or more autonomous vehicle-mounted processors, an aggressiveness of the autonomous vehicle to match of the average level or aggressiveness of the surrounding vehicles to facilitate uniform traffic flow.

Determining, via the one or more autonomous vehicle-mounted processors, an average level of aggressive driving or operation of the surrounding vehicles may include inputting the data associated with surrounding vehicle operation into a machine learning program trained to determine an average level of aggressive driving or aggressiveness of surrounding vehicles based upon the data. The data associated with surrounding vehicle operation may include image data acquired via a camera and/or data acquired via a radar unit. The data associated with surrounding vehicle operation may include vehicle speed information of surrounding vehicles, following or average following distance information of one or more surrounding vehicles, braking information associated with one or more surrounding vehicles, and/or acceleration information associated with one or more surrounding vehicles. Additionally or alternatively, the data associated with surrounding vehicle operation may include data generated by one or more surrounding vehicles or smart infrastructure, and received via wireless communication broadcast over one or more radio links or wireless communication channels.

Example System for Adjusting Behavior of an Autonomous Vehicle

Figure 8:
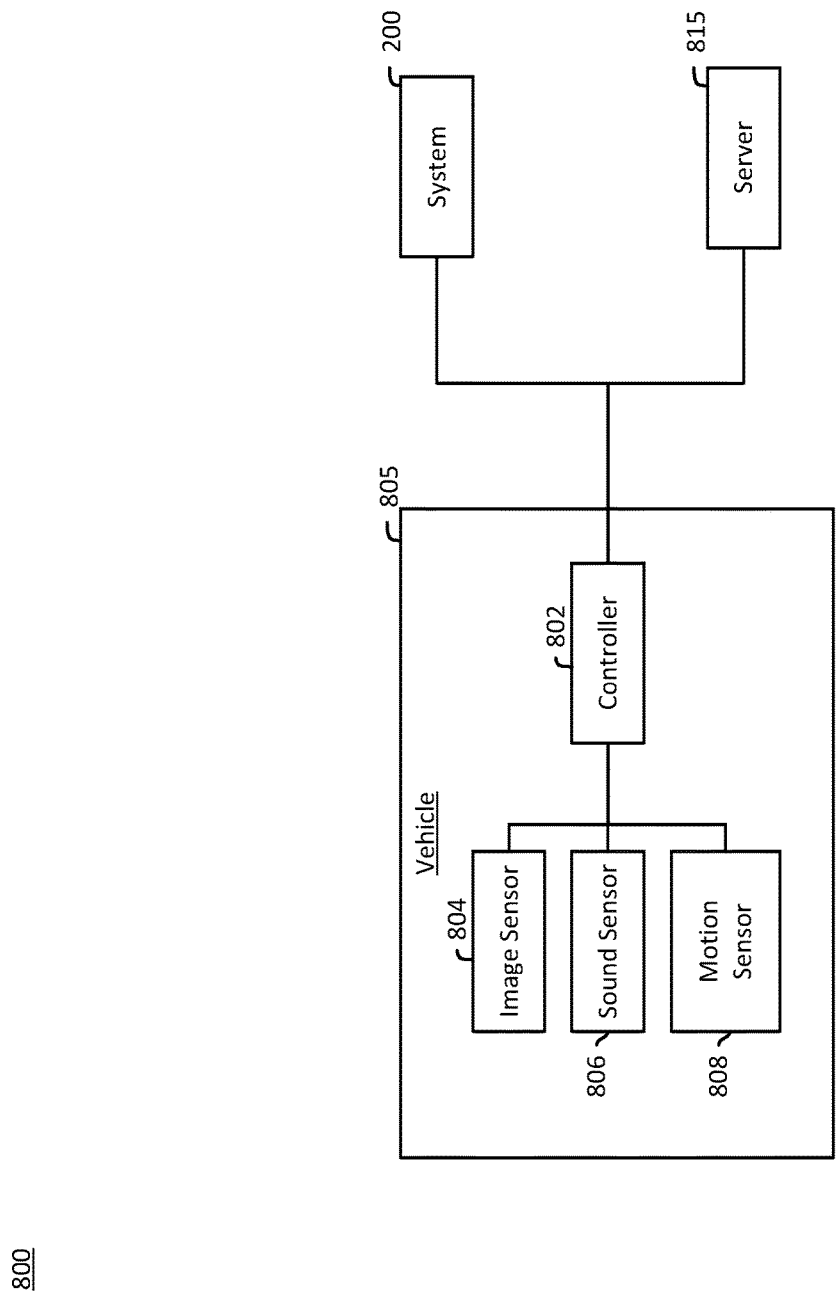
FIG. 8 illustrates an example system for controlling an autonomous vehicle according to one embodiment.

FIG. 8 illustrates an example electronic system 800 for adjusting behavior of an autonomous vehicle in response to a proximate vehicle according to an embodiment. The system 800 may implement the method 700 discussed with reference to FIG. 7.

The system 800 may include an autonomous vehicle 805, which may include one or more of: a controller 802, an image sensor 804, a sound sensor 806, and/or a motion sensor 808. The system 800 may include the system 200 shown in FIG. 2 and/or the server 815.

The vehicle 805 may be any suitable vehicle (e.g., automobile, aircraft, watercraft, hovercraft, etc.). In some instances, the vehicle 805 may be referred to as "self-driving." The controller 802 is configured to control various systems of the vehicle 805, such as the throttle, brakes, lights, etc.

The controller 802 is a computer system including a processor and memory. The controller 802 may include a communication interface, which may be configured for wired or wireless communication. The controller 802 may be communicatively coupled to one or more of: the image sensor 804, the sound sensor 806, the motion sensor 808, the system 200, and/or the server 815. One or more of the image sensor 804, sound sensor 806, and motion sensor 808 may be mounted to the body of the vehicle 805 (e.g., along the side, back or front). The sensors 804-808 may be mounted so that they are directed toward potential traffic proximate to the vehicle 805. The image sensor 804 may be any suitable image sensor, such as a digital camera, laser camera, or video camera. The sound sensor 806 may be any suitable microphone or sound sensor. The motion sensor 808 may be any suitable motion sensor, and may be laser-based, radar-based, microwave-based, etc.

In example operation, the image sensor 804 may actuate in response to a command from the controller 802 to capture an image and/or video of a proximate vehicle, and may transmit the captured image to the controller 802. The controller 802 may then analyze the captured image to estimate a characteristic of the proximate vehicle, such as speed or acceleration. The controller 802 may do this by, for example, analyzing the relative motion of the proximate vehicle during a certain portion of video or over a number of pictures, relative to a known orientation and movement of the vehicle 805, to estimate the speed and/or acceleration of the proximate vehicle. In some instances, rather than relying on video or images, the controller 802 may rely on measurements obtained by a radar or laser system. Likewise, the controller 802 may rely on measurements from the sound sensor 806 and the Doppler effect to analyze relative motion of the proximate vehicle.

The controller 802 may adjust an aggression factor based on the estimated aggression level of the proximate vehicle. For example, the controller 802 may score the estimated aggression level of the proximate vehicle on a scale of 0-100. The controller 802 may then rely on this score to adjust the aggression factor, which may also be scaled 0-100.

The controller 802 may control the autonomous vehicle 805 utilizing the aggression factor. For example, the controller 802 may utilize the aggression factor to determine a rate for braking, accelerating, and/or turning. The higher the aggression factor (e.g., closer to 100), for example, the higher the rate of braking, accelerating, and/or turning. In some instances, the controller 802 may also rely on the aggression factor to determine a "nearest-object" threshold. For example, with a higher aggression factor, the controller 802 may allow the vehicle 805 to get closer to external objects (e.g., vehicles, curbs, and other obstacles) before turning or braking.

The controller 802 may transmit the aggression level and/or aggression factor to the system 200, which may utilize the aggression level and/or aggression factor when calculating a risk index. The controller 802 may transmit the aggression level and/or aggression factor to the server 815, which may store the estimate and/or assign it to a profile assigned with a customer or with the vehicle 805.

Exemplary Embodiments

In one aspect, a computer-implemented method of reducing vehicle collisions may be provided. The method may include, via one or more processors, transceivers, servers, and/or sensors: calculating a risk index, wherein calculating the risk index comprises: (i) calculating a number of observed vehicle collisions for a particular area over the time period; (ii) determining a market share or market penetration factor for the particular area for an auto insurer; and/or (iii) calculating the risk index or an expected number of vehicle collisions for a particular area based, at least in part, upon (i) the number of observed collisions, and (ii) the market share or market penetration factor. The number of observed vehicle collisions may be calculated based upon historical traffic data for the particular area, and/or based upon historical or past auto insurance claim data for the particular area associated with the auto insurer's customers, and may be calculated with the auto insurer's customer's permission or affirmative consent.

The market share or market penetration factor may normalize or account for total traffic flow through the particular area, such as a high risk intersection, by using the insured's market share (e.g., if market share is 25% for a particular area (such as a city, county, or state) for the insurer, multiply the number of auto accidents revealed by the insurer's auto insurance claim data for that particular area by 4 to reach or reflect 100% of the normal or expected traffic flow for the particular area. Or if the auto insurer market share is 40%, multiply the number of observed vehicle collisions by 2.5 to reach expected traffic flow for an area or intersection, for instance).

The number of observed vehicle collisions may be calculated based upon historical traffic data for multiple areas and corresponds to an average risk for the multiple areas. The number of expected collisions may be a function of traffic flow. The number of expected collisions may be adjusted for past market penetration or share, and the observed collisions may be limited to observations involving vehicles within the market corresponding to the market penetration.

The method may include generating a risk map based upon the risk index, and the risk map may include graphic elements depicting risk indices for a plurality of areas in addition to the particular area. The risk map may be a heat map, and may be transmitted, via wireless communication or data transmission over one or more radio frequency links or wireless communication channels to government entity servers (to facilitate road repair or construction of high risk roads and intersections, or diversion of government resources to higher risk areas or areas in need of prompt attention by road crews), and/or customer vehicle navigation units or mobile devices for display.

The risk index may account for a type of past vehicle damage associated with past or historic vehicle collisions occurring at the particular area. The risk index may account for an extent and/or number of past personal injuries or medical costs/services required associated with past or historic vehicle collisions occurring at the particular area. The risk index may account for a type of past personal injuries or medical costs/services required associated with past or historic vehicle collisions occurring at the particular area. The risk index may account for an extent of past, and/or type of, liability expenses associated with past or historic vehicle collisions occurring at the particular area, and/or account for a total amount of monies paid for auto insurance claims associated with past or historic vehicle collisions occurring at the particular area.

The present embodiments may include one or more means for performing any one or more of the methods discussed herein. The present embodiments may include a computer system configured to reduce vehicle collisions comprising: a processor; and one or more memory devices storing non-transitory computer readable instructions that when executed cause the processor to implement any one or more of the methods discussed herein.

In another aspect, a computer-implemented method of reducing vehicle collisions may be provided. The method may include, via one or more processors, transceivers, servers, and/or sensors: determining high risk areas (such as high risk intersections), wherein calculating the high risk areas (and/or intersections) comprises: (i) calculating a number of observed vehicle collisions for a particular area over the time period by analyzing auto insurance claims or claim data for an individual insurer; (ii) adjusting the number of observed vehicle collisions for the particular area to account for market share or market penetration factor for the particular area for the auto insurer (such as normalize the observed vehicle collisions to account for 100% of expected traffic, and/or traffic of vehicles insured by other insurers) to arrive at a total number of expected or anticipated vehicle collisions for a given period of time (such as a week, month, 3 months, or year, or season—spring, summer, fall, or winter) for the particular area; and/or (iii) if the total number of expected or anticipated vehicle collisions for a given period of time for the particular area exceeds a threshold or predetermined amount, then generating an electronic alert detailing that the particular area is a high risk area.

The number of observed vehicle collisions may be calculated based upon historical traffic data for the particular area, and/or calculated based upon historical or past auto insurance claim data for the particular area associated with the auto insurer's customers, and may be calculated with the auto insurer's customers' permission or affirmative consent.

The market share or market penetration factor may normalize or otherwise account for total traffic flow through the particular area, such as a high risk intersection, by using the insured's market share (e.g., if market share is 25% for a particular area (such as a city, county, or state) for the insurer, multiply the number of auto accidents revealed by the insurer's auto insurance claim data for that particular area by 4 to reach or reflect 100% of the normal or expected traffic flow for the particular area).

The number of observed vehicle collisions may be calculated based upon historical traffic data for multiple areas and may correspond to an average risk for the multiple areas. The number of expected or anticipated collisions may be a function of actual, past, or anticipated traffic flow. Additionally or alternatively, the number of expected collisions may be adjusted for past market penetration or share, and the observed collisions may be limited to observations involving vehicles within the market corresponding to the market penetration.

The method may include generating a risk map based upon the risk index. The risk map may include graphic elements depicting risk indices for a plurality of areas in addition to the particular area. The risk map may be a virtual heat map, and may be transmitted, via wireless communication or data transmission over one or more radio frequency links or wireless communication channels to government entity servers (to facilitate road repair or construction of high risk roads and intersections) and/or customer vehicle navigation units or mobile devices for vehicle navigation.

Calculating a number of observed vehicle collisions for a particular area over the time period by analyzing auto insurance claim for an individual insurer may account for a type or extent of past vehicle damage associated with past or historic vehicle collisions occurring at the particular area; an extent and/or number of past personal injuries or medical costs/services required associated with past or historic vehicle collisions occurring at the particular area; a type of past personal injuries or medical costs/services required associated with past or historic vehicle collisions occurring at the particular area; an extent of past, and/or type of, liability expenses associated with past or historic vehicle collisions occurring at the particular area; and/or a total amount of monies paid for auto insurance claims associated with past or historic vehicle collisions occurring at the particular area.

In another aspect, a computer-implemented method of reducing vehicle collisions may be provided. The method may include (1) retrieving, via one or more processors, auto insurance claim data from one or more memory units, and/or receiving, via one or more processors and/or transceivers (such as via wireless communication or data transmission over one or more radio frequency links or wireless communication channels), auto insurance claim data; (2) analyzing, via the one or more processors, the auto insurance claim data based upon vehicle collision location; (3) identifying, via the one or more processors, one or more high risk areas associated with a number or type of vehicle collisions that exceeds a predetermined amount or threshold; and/or (4) generating, via the one or more processors, an electronic alert detailing the one or more high risk areas to facilitate reducing vehicle collisions.

The method may include generating, via the one or more processors, a virtual map depicting, or graphical depiction of, the one or more high risk areas; and/or transmitting, via the one or more processors and/or transceivers, the virtual map to remote or local servers or to customer mobile devices for display. The computer-implemented method may include transmitting, via the one or more processors and/or transmitters, the electronic alert to remote or local servers or to customer mobile devices for display.

Identifying, via the one or more processors, one or more high risk areas associated with a number or type of vehicle collisions that exceeds a predetermined amount or threshold may include the one or more processors determining (i) high risk areas that are associated with vehicle collisions that are over a predetermined amount of vehicle damage; (ii) high risk areas that are associated with vehicle collisions that are associated with vehicle damage of a certain type or extent; (iii) high risk areas that are associated with vehicle collisions that include a certain number and/or type of personal injuries; (iv) high risk areas that are associated with vehicle collisions that include a certain number and/or type of vehicle damages and/or vehicle repairs; (v) high risk areas that are associated with vehicle collisions that include liability claims or damages over a predetermined amount; and/or (vi) high risk areas that are associated with a certain type of vehicle or autonomous vehicle, such by make/model or autonomous vehicle features.

Identifying, via the one or more processors, one or more high risk areas associated with a number or type of vehicle collisions that exceeds a predetermined amount or threshold includes the one or more processors adjusting vehicle collisions at particular areas for insurer market penetration or market share prior to determining some of the particular areas are high risk areas at above risk of vehicle collision and/or vehicle damage or personal injuries.

In another aspect, a computer system configured to reduce vehicle collisions may be provided. The computer system may include one or more processors, servers, transceivers, and/or sensors configured to: retrieve auto insurance claim data from one or more memory unit, and/or receive (such as via wireless communication or data transmission over one or more radio frequency links or wireless communication channels) auto insurance claim data; analyze the auto insurance claim data based upon vehicle collision location; identify one or more high risk areas associated with a number or type of vehicle collisions that exceeds a predetermined amount or threshold; and/or generate an electronic alert detailing the one or more high risk areas to reduce vehicle collisions.

The computer system may be configured to: generate a virtual map depicting, or graphical depiction of, the one or more high risk areas; and/or transmit the virtual map to remote or local servers or to customer mobile devices for display. The computer system may be configured to: transmit the electronic alert to remote or local servers or to customer mobile devices for display.

The computer system may be configured to identify one or more high risk areas associated with a number or type of vehicle collisions that exceeds a predetermined amount or threshold by the one or more processors determining high risk areas that are associated with vehicle collisions that are (i) over a predetermined amount of vehicle damage; (ii) associated with vehicle collisions that are associated with vehicle damage of a certain type; (iii) associated with vehicle collisions that include a certain number and/or type of personal injuries; (iv) associated with vehicle collisions that include a certain number and/or type of vehicle damages and/or vehicle repairs; (v) associated with vehicle collisions that include liability claims or damages over a predetermined amount; and/or (vi) associated with, or involve, autonomous vehicles or vehicles equipped with autonomous or semi-autonomous features or systems.

The computer system may be further configured to identify one or more high risk areas associated with a number or type of vehicle collisions that exceeds a predetermined amount or threshold by the one or more processors adjusting vehicle collisions at particular areas for insurer market penetration or market share prior to determining some of the particular areas are high risk areas at above risk of vehicle collision and/or vehicle damage or personal injuries.

The foregoing computer systems may include additional, less, or alternate functionality, including that discussed elsewhere herein, and may be implemented via computer-executable instructions stored on non-transitory computer-readable medium or media. The foregoing computer-implemented methods may include additional, less, or alternate actions, including those discussed elsewhere herein. The foregoing computer-implemented methods may be implemented via local or remote processors, transceivers, memory units, servers, and/or sensors, and/or may be implemented via computer-executable instructions stored on non-transitory computer readable media or medium.

Additional Considerations

Although this detailed description contemplates various embodiments, it should be understood that the legal scope of any claimed system or method is defined by the words of the claims set forth at the end of this patent. This detailed description is to be construed as exemplary only and does not describe every possible embodiment, as describing every possible embodiment would be impractical, if not impossible.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This description, and the claims that follow, should be read to include one or at least one. The singular also includes the plural unless it is obvious that it is meant otherwise.

In various embodiments, hardware systems described herein may be implemented mechanically or electronically. For example, a hardware system may comprise dedicated circuitry or logic that is permanently configured (e.g., as a special-purpose processor, such as a field programmable gate array (FPGA) or an application-specific integrated circuit (ASIC) to perform certain operations). A hardware system may also comprise programmable logic or circuitry (e.g., as encompassed within a general-purpose processor or other programmable processor) that is temporarily configured by software to perform certain operations. It will be appreciated that the decision to implement a hardware system mechanically, in dedicated and permanently configured circuitry, or in temporarily configured circuitry (e.g., configured by software) may be driven by cost and time considerations.

References to a "memory" or "memory device" refer to a device including computer-readable media ("CRM"). "CRM" refers to a medium or media accessible by the relevant computing system for placing, keeping, and/or retrieving information (e.g., data, computer-readable instructions, program modules, applications, routines, etc.). Note, "CRM" refers to media that is non-transitory in nature, and does not refer to disembodied transitory signals, such as radio waves. The CRM of any of the disclosed memory devices may include volatile and/or nonvolatile media, and removable and/or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which may be used to store information and which may be accessed by the computing system. One or more of the disclosed memory devices may be coupled a processor via a memory interface. A memory interface is circuitry that manages the flow of data between the memory device and the bus of the computer system to which it is coupled.

References to a "communication interface" or "network interface" generally refer to one or more interfaces for a system that enable the system to send information/data to other system, and/or to receive information/data from other systems or devices. These other systems or devices may include input devices (e.g., keyboard, mouse, etc.), output devices (e.g., a display device, speakers, etc.), networking equipment (e.g., routers, modems, etc.), and other computing devices (e.g., servers, mobile devices, etc.). In some instances, the communication interface of a system may be utilized to establish a direct connection to another system. In some instances, a communication interface of a system enables the system to connect to a network (via a link). Depending on the embodiment, the communication interface may include circuitry for permitting wireless communication (e.g., short-range and/or long-range communication) or wired communication with one or more devices or systems using any suitable communications protocol. For example, the communication interface 204 shown in FIG. 2 may support Wi-Fi (e.g., an 802.11 protocol), Ethernet, Bluetooth, high frequency systems (e.g., 900 MHZ, 2.4 GHZ, and 5.6 GHZ communication systems), infrared, transmission control protocol/internet protocol ("TCP/IP") (e.g., any of the protocols used in each of the TCP/IP layers), hypertext transfer protocol ("HTTP"), BitTorrent, file transfer protocol ("FTP"), real-time transport protocol ("RTP"), real-time streaming protocol ("RTSP"), secure shell protocol ("SSH"), any other communications protocol, or any combination thereof. The communication interface 204 may include circuitry that enables the system to be electrically or optically coupled to another device (e.g., via a coax cable or fiber optic cable) and to communicate with that other device.

A "communication link" or "link" is a pathway or medium connecting two or more nodes. A link may be a physical link and/or a logical link. A physical link is the interface and/or medium(s) over which information is transferred, and may be wired or wireless in nature. Examples of physicals links may include a cable with a conductor for transmission of electrical energy, a fiber optic connection for transmission of light, and/or a wireless electromagnetic signal that carries information via changes made to one or more properties of an electromagnetic wave(s).

A logical link between two or more nodes represents an abstraction of the underlying physical links and/or intermediary nodes connecting the two or more nodes. For example, two or more nodes may be logically coupled via a logical link. The logical link may be established via any combination of physical links and intermediary nodes (e.g., routers, switches, or other networking equipment).

A link is sometimes referred to as a "communication channel." In a wireless communication system, the term "communication channel" (or just "channel") generally refers to a particular frequency or frequency band. A carrier signal (or carrier wave) may be transmitted at the particular frequency or within the particular frequency band of the channel. In some instances, multiple signals may be transmitted over a single band/channel. For example, signals may sometimes be simultaneously transmitted over a single band/channel via different sub-bands or sub-channels. As another example, signals may sometimes be transmitted via the same band by allocating time slots over which respective transmitters and receivers use the band in question.

The performance of certain of the operations may be distributed among one or more processors, not only residing within a single machine, but deployed across a number of machines. In some example embodiments, the described processor or processors may be located in a single location (e.g., within a home environment, an office environment or as a server farm), while in other embodiments the processors may be distributed across a number of locations.

Words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

The invention claimed is:

1. A system for controlling an autonomous vehicle, the system comprising:
   a sensor mounted to an autonomous vehicle to capture first data associated with a first proximate vehicle, and second data associated with a second proximate vehicle; and
   a controller for the autonomous vehicle configured to:
      analyze the first data to estimate a first aggression level of the first proximate vehicle, the first aggression level representing a first combination of a first rate of acceleration, a first rate of deceleration, and a first rate of turning of the first proximate vehicle;
      analyze the second data to estimate a second aggression level of the second proximate vehicle, the second aggression level representing a second combination of a second rate of acceleration, a second rate of deceleration, and a second rate of turning of the second proximate vehicle;
      combine the first aggression level and the second aggression level to determine an average aggression level; and
      control a third combination of a third rate of acceleration, a third rate of deceleration, and a third rate of turning of the autonomous vehicle so the autonomous vehicle operates with a third aggression level that corresponds to the average aggression level.

2. The system of claim 1, wherein the sensor is at least one of a motion sensor, an audio sensor, or a laser sensor.

3. The system of claim 1, wherein the first aggression level includes a speed.

4. The system of claim 1, wherein controlling the autonomous vehicle so the autonomous vehicle operates with the third combination of the third aggression level that corresponds to the average aggression level includes adjusting at least one of the third rate of acceleration, the third rate of deceleration, a speed, a swerve factor, or the third rate of turning of the autonomous vehicle based on the aggression level.

5. The system of claim 1, wherein the average aggression level is scored on a scale of 0-100.

6. A method for controlling an autonomous vehicle, the method comprising:
   capturing, by a sensor mounted to the autonomous vehicle, first data associated with a first proximate vehicle, and second data associated with a second proximate vehicle;
   analyzing the first data to estimate a first aggression level of the first proximate vehicle, the first aggression level representing a first combination of a first rate of acceleration, a first rate of deceleration, and a first rate of turning of the first proximate vehicle;
   analyzing the second data to estimate a second aggression level of the second proximate vehicle, the second aggression level representing a second combination of a second rate of acceleration, a second rate of deceleration, and a second rate of turning of the second proximate vehicle;
   combine the first aggression level and the second aggression level to determine an average aggression level; and
   operating the autonomous vehicle with a third aggression level matching the average aggression level.

7. The method of claim 6, wherein the first aggression level includes an estimated speed.

8. The method of claim 6, wherein the first aggression level includes an estimated swerve factor.

9. The method of claim 6, wherein capturing the first data associated with the first proximate vehicle comprises detecting audio associated with the proximate vehicle.

10. The method of claim 6, wherein operating the autonomous vehicle with the third aggression level matching the average aggression level comprises adjusting, at least one of a third rate of acceleration, a third rate of deceleration, a speed, a swerve factor, or a third rate of turning of the autonomous vehicle.

11. A system for controlling an autonomous vehicle, the system comprising:
   a means for capturing first data associated with a first proximate vehicle that is proximate to an autonomous vehicle, and second data associated with a second proximate vehicle that is proximate to the autonomous vehicle;
   a means for analyzing the first data to estimate a first aggression level, the first aggression level representing a first combination of a first rate of acceleration, a first rate of deceleration, and a first rate of turning of the first proximate vehicle;
   a means for analyzing the second data to estimate a second aggression level, the second aggression level representing a second combination of a second rate of acceleration, a second rate of deceleration, and a second rate of turning of the first proximate vehicle;
   a means for computing an average of the first aggression level and the second aggression level to form a collective aggression level; and
   a means for controlling the autonomous vehicle according to the collective aggression level.

12. The system of claim 11, wherein the means for capturing the first data associated with the first proximate vehicle comprises a motion sensor.

13. The system of claim 11, wherein the means for capturing the first data associated with the first proximate vehicle comprises an audio sensor.

14. The system of claim 11, wherein the means for capturing the first data associated with the first proximate vehicle comprises a laser sensor.

15. The system of claim 11, wherein the means for capturing the first data associated with the first proximate vehicle comprises a means for detecting audio associated with the first proximate vehicle.

16. The system of claim 11, wherein the means for controlling the autonomous vehicle according to the collective aggression level comprises a means for adjusting, based on the collective aggression level, at least one of a third rate of acceleration, a third rate of deceleration, a speed, a swerve factor, or a third rate of turning of the autonomous vehicle.

\* \* \* \* \*